Dec. 18, 1934.　　　　　G. KELLER　　　　　1,985,172
LIGHTING DEVICE FOR TELEPHONES
Filed Oct. 26, 1932　　　2 Sheets-Sheet 1
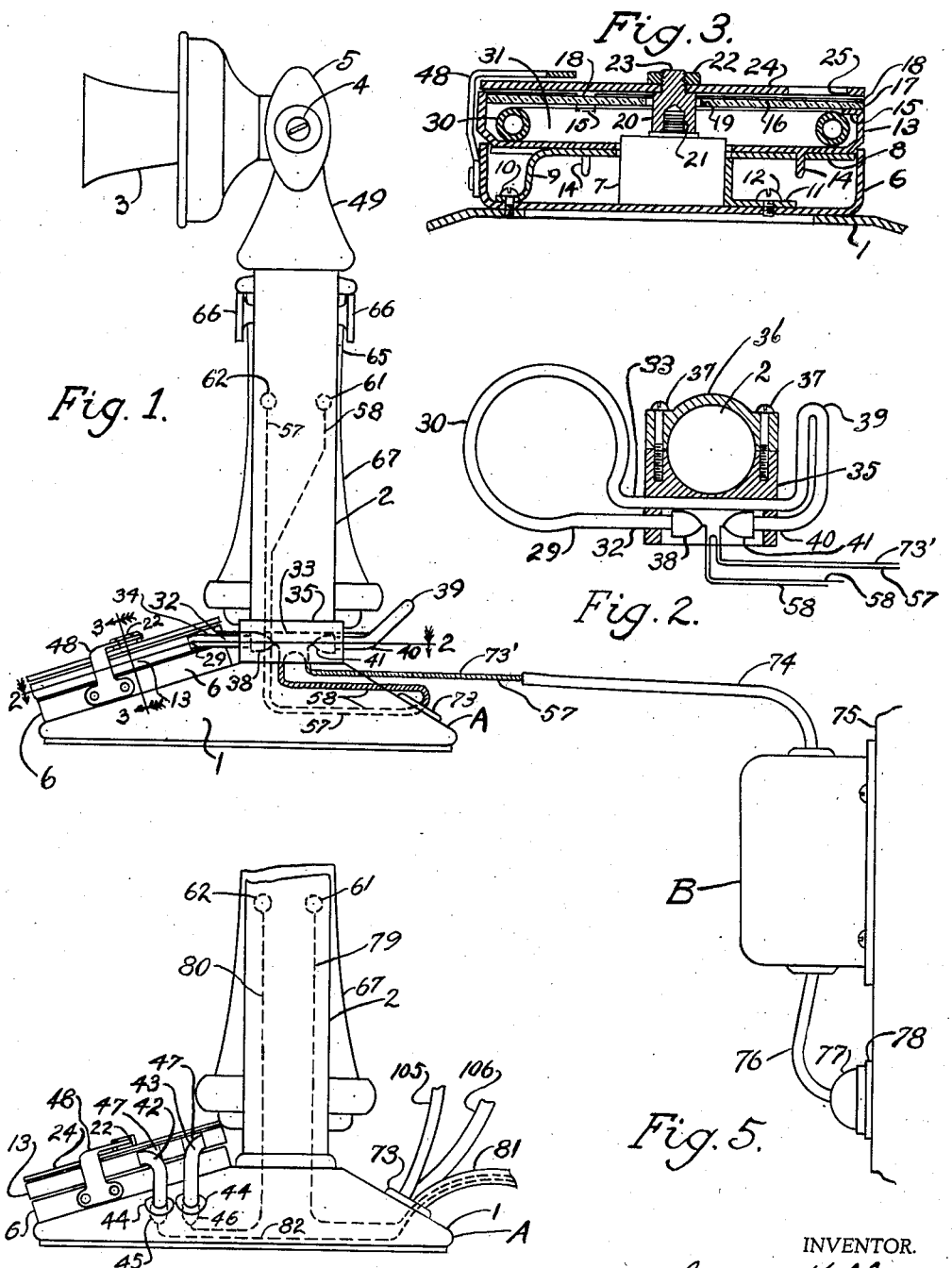

Dec. 18, 1934.　　G. KELLER　　1,985,172
LIGHTING DEVICE FOR TELEPHONES
Filed Oct. 26, 1932　　2 Sheets-Sheet 2
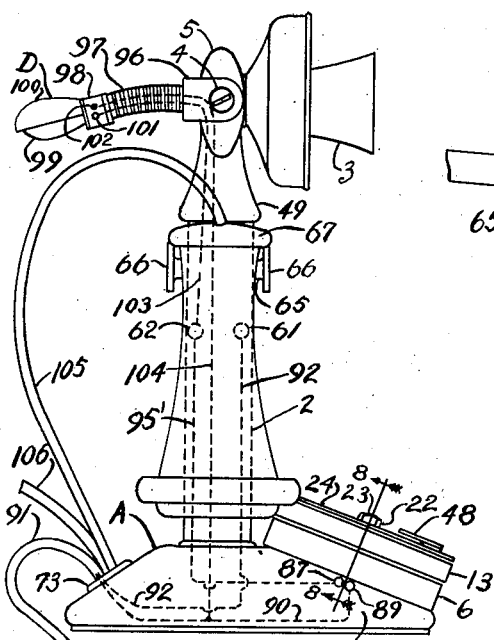
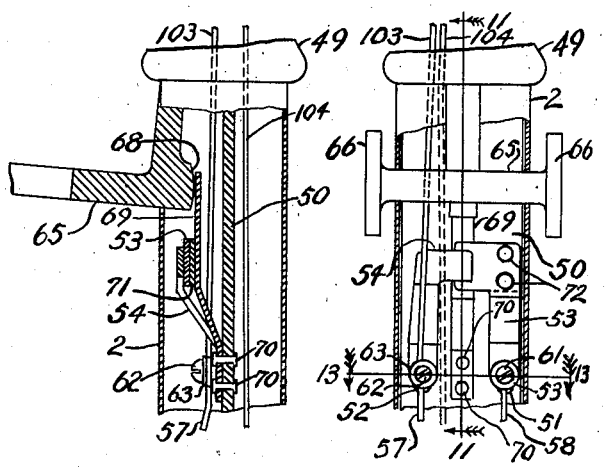
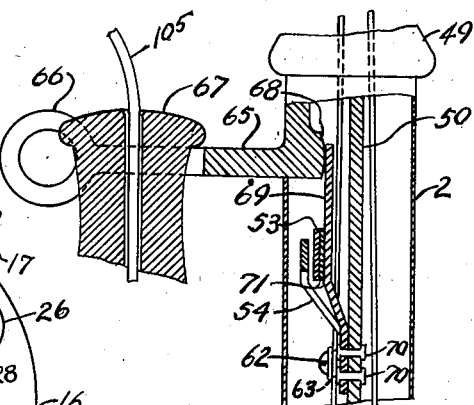
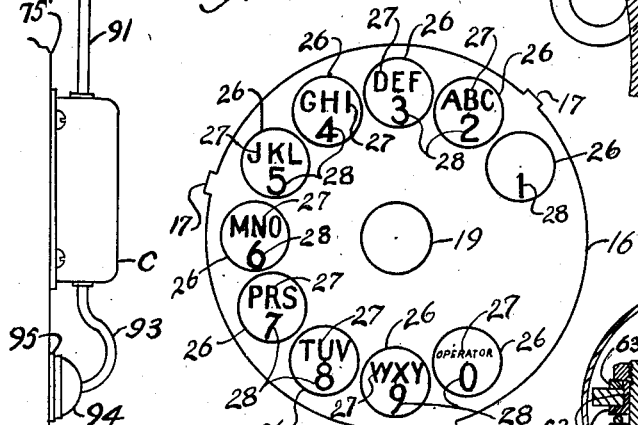
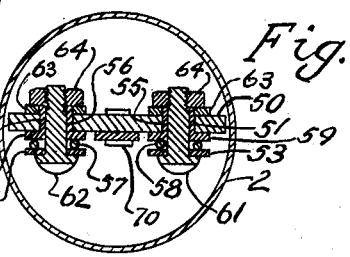
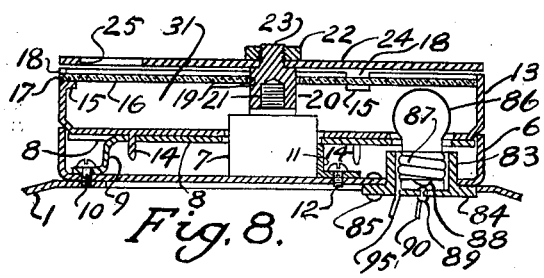
INVENTOR.
George Keller
BY
George B. Ingersoll
ATTORNEY.

Patented Dec. 18, 1934

1,985,172

UNITED STATES PATENT OFFICE 1,985,172

LIGHTING DEVICE FOR TELEPHONES

George Keller, Detroit, Mich.

Application October 26, 1932, Serial No. 639,667

17 Claims. (Cl. 240—2.17)

My invention relates to improvements in lighting devices for telephones in which lighting means is used in conjunction with the telephone device; and the objects of my improvement are, first, to provide a lighting means located below the dial member of a telephone; second, to provide a lighting means automatically controlled by a switch means operated by the operation of a portion of the telephone mechanism; third, to provide a lighting means that can be installed on a telephone with a minimum number of changes in the mechanism of the telephone; fourth, to provide a lighting means for a telephone said lighting means being readily adjustable for illumination of any part of the telephone or its surroundings; fifth, to provide a lighting means adjustably mounted on a telephone, said lighting means having a manually controlled shield member; sixth, to provide a lighting means for a telephone, said lighting means using neon gas; seventh, to provide a lighting means for a telephone, said lighting means utilizing a neon illumination member; eighth, to provide a telephone illumination means employing a plurality of electrically operated light devices; ninth, to provide a telephone with a dial member adapted to permit light to shine therethrough; and tenth, to provide a lighting means for a telephone, said lighting means utilizing an electric current passing through a transformer.

I attain these objects by mechanism illustrated in the accompanying drawings, in which:—

Figure 1 is a side elevation of a telephone equipped with my lighting means utilizing a neon gas container member operated by an electric current passing through a transformer, said neon gas container being provided with a portion for illuminating a dial member together with a portion for illuminating the upper portion of the telephone; Fig. 2, a section through the means for attaching the neon gas container member to the telephone, said section being taken on the line 2—2, Fig. 1, said section disclosing the neon gas container member separately from the dial machanism of the telephone; Fig. 3, a cross section of the dial mechanism and the neon lighting means; Fig. 4, a partial side elevation of the telephone equipped with a neon gas container member electrically operated and adapted to illuminate principally the dial member of the telephone; Fig. 5, a side elevation of the transformer electrically connected with the telephone disclosed in Fig. 1; Fig. 6, a side elevation of a telephone equipped with my lighting means when utilizing an electric light bulb of conventional design; Fig. 7, a side elevation of a transformer electrically connected with the telephone as disclosed in Fig. 6; Fig. 8, a cross section of the dial mechanism used in the telephone as disclosed in Fig. 6; Fig. 9, a plan view of a lettered dial plate constructed of suitable material to permit light to shine therethrough; Fig. 10, a partial vertical sectional view of the receiver hook and switch mechanism disclosing the contact made by the switch mechanism when the receiver is lifted from the receiver hook; Fig. 11, a partial vertical sectional view of the receiver hook and switch mechanism disclosing the contact made by the switch mechanism when the receiver is lifted from the receiver hook and switch mechanism, said view being taken on the line 11—11, Fig. 10; Fig. 12, a partial vertical sectional view of the receiver hook and switch mechanism disclosing the contact broken by the switch mechanism when the receiver is placed on the receiver hook, said view being taken on the line 11—11, Fig. 10; and Fig. 13, a horizontal section taken on the line 13—13, Fig. 10.

Similar numerals refer to similar parts throughout the several views.

The telephone assembly A, disclosed in Fig. 1, may be of the conventional construction used in telephone devices and may be readily equipped with my lighting means. The telephone assembly A is provided with a base portion formed by the housing 1, which supports the operating mechanism of the telephone, the standard 2, and the transmitter 3 which is pivotally supported on the clamping screw 4 which extends through the bosses 5. The housing 1 is provided with the member 6, which is suitably attached thereto and extends around the support member 7 for the dial mechanism which is not disclosed in detail because my invention is adapted to be assembled with and operate in conjunction with the dial operative mechanism of any telephone device or instrument. The plate member 8 forms a part of the usual telephone device and is supported by the extension portion 9 which is attached to the member 6 by the screw 10, the extension portion 9 being formed by displacing a portion of the plate member 8. The plate member 8 may be formed with a plurality of extension portions 9 and may also be supported by resting upon the upper side of the support member 11 which is secured to the member 6 by a plurality of screws 12, the support member 11 being used to support a portion (not shown) of the dial mechanism as used in a conventional telephone. To adapt my lighting means to the conventional type of telephone, as disclosed in Figs. 1 and 3, I mount the cup member 13 on the plate member 8, the cup member 13 being formed with extension portions 14 which extend through suitable openings in the plate member 8, said plate member 8 being conventionally provided with a plurality of openings of various sizes therethrough. The extension portions 14 thus anchor and restrain the cup member 13 from rotative movement relative to the plate member 8.

The cup member 13 is provided with a series of ledges 15, which may be formed by displacing a portion of its wall portion, the ledges 15 supporting the dial plate 16 which is constructed with tongue portions 17 which fit within the slots 18 which are formed by the displacement of a portion of the wall to form the ledges 15. The dial plate 16 is thus prevented from rotating relative to the cup member 13. The dial plate 16 is provided with the opening 19 which provides clearance around the extension nut 20. The cup member 13 and the plate member 8 are also provided with openings, similar to the opening 19, for providing clearance around the support member 7. The extension nut 20 threadably engages the stud portion 21 of the support member 7, the extension nut 20 replacing the nut 22 which engages the stud portion 23 of the extension nut 20, the nut 22 being used in the conventional telephone device for engaging the stud portion 21 to secure the finger dial 24 thereon. In my invention the finger dial 24 is secured to the stud portion 23 by the nut 22, the finger dial 24 being adapted to revolve with the extension nut 20 which in turn is adapted to revolve to operate the usual dial mechanism of a telephone.

It is to be noted that the finger dial 24 will be provided with a plurality of finger holes, one of which is disclosed at 25 in Figs. 3 and 8, said holes being further indicated by the circles 26 in Fig. 9, said circles 26 indicating the normal position of the holes 25 relative to the letters 27 and the numerals 28. The dial plate 16 is made of suitable material such as glass or similar material as will permit light rays to shine therethrough and cause the letters 27 and the numerals 28 to stand out in an exceptional and distinct manner when my lighting means is illuminated as hereinafter disclosed. The tube, bulb, or container member 29 is constructed in a manner similar to that of the neon light in which a glass member is filled with neon gas and the container is connected with a source of electric current which is conducted by the neon gas through the tube 29 to provide illumination.

The tube 29 is provided with the circular portion or convolution 30 which extends circumferentially around the chamber 31 which exists within the cup member 13, the tube 29 being provided with the parallel portions 32 and 33 which extend through suitable openings 34 in the cup member 13, the parallel portions 32 and 33 extending within the bracket 35 which may be secured to the standard 2 by means of the cap member 36 being secured to the bracket 35 by means of the screws 37. The bracket 35 and the cap member 36 may be made of suitable material, such as semi-hard rubber composition or similar material to provide a support that will not injure the tube 29 and also will provide an insulator member therefor.

The parallel portion 32 of the tube 29 is provided with the terminal portion 38 and the parallel portion 33 extends entirely through the bracket 35 to join the convolution portion 39 which is located at the rear of the standard 2 in a manner to provide illumination adjacent the telephone assembly A when desired, the convoluted portion 39 being provided with the portion 40, which extends parallel with the parallel portions 32 and 33, and which is provided with the terminal portion 41. Where it is desired to use the tube 29 for the purpose of illuminating the dial plate 16 without supplying illumination adjacent the telephone assembly A, the convolution portion 39 may be eliminated and the tube 29 will then be constructed with the portions 42 and 43 which may extend into the housing 1 through suitable grommets 44, the portions 42 and 43 being provided with the terminal portions 45 and 46 located within the housing 1, the portions 42 and 43 extending through the openings 47 in the cup member 13. The extension member 48 is suitably attached to the member 6 and extends over the finger dial 24 to form a stop member for the finger when operating the finger dial 24.

The head portion 49 which supports the bosses 5 and the transmitter 3 rests on the upper end of the standard 2 and is provided with the extension member 50 which extends within the standard 2 and forms the support for the conventional switch mechanism, terminal members, wires, etc. The extension member 50 is provided with the two openings or apertures 51 and 52 which may be used for attaching the switch contact members 53 and 54, thus avoiding the necessity of forming additional openings in the extension member 50 for supporting my switch mechanism for controlling the operation of my lighting means.

The insulator bushings 55 and 56 are respectively inserted in the openings 51 and 52 and the switch contact members 53 and 54 are clamped in position with the terminal ends of the wires 57 and 58 secured against the shoulders 59 and 60 respectively of the insulator bushings 55 and 56 by the bolts 61 and 62, the bolts 61 and 62 being secured by the insulator washers 63 and the nuts 64.

The receiver hook 65 is pivotally mounted in a conventional way in the head portion 49 and is provided with the forks 66 for supporting the receiver 67. The receiver hook 65 is provided with the contact portion 68 for contacting with the switch operating member 69 which is secured to the extension member 50 by the rivets 70, the switch operating member 69 together with the contact portions 68 of the receiver hook 65 constituting the means, in the conventional telephone assembly for controlling the operation of the telephone mechanism. The switch contact members 53 and 54 and the switch operating member 69 are constructed of suitable resilient material to flexibly operate as hereinafter disclosed.

The insulator member 71 is secured to the switch contact member 53 by the rivets 72 and prevents any short circuit of the electric current from the switch contact member 53 and to the switch operating member 69.

Fig. 1 discloses the electric wires 58 and 57 being respectively attached to the terminal screws 61 and 62 as above described, the wire 57 extending through the standard 2 and the housing 1 to emerge through the grommet 73 from the housing 1, the wires 57 and 58 being indicated diagrammatically, by single dotted lines, within the telephone assembly A and the bracket 35. The wire 58 extends through the standard 2 and the housing 1 and also emerges through the grommet 73 and is further extended to and within the bracket 35 to connect with the terminal portion 38 of the parallel portion 32 of the tube 29. The wire 57 may also extend adjacent the wire 58, after said wire 58 emerges through the grommet 73, to a point where it may be supported in the bracket 35 and again extend therefrom adjacent the wire 73′ which is connected to the terminal portion 41 of the portion 40 of the tube 29 and to the transformer assembly B as disclosed in Fig. 5. The wires 73′ and the adjacent portion of the wire 57 are shown so that the wires 73′ and 57 may be enclosed in the conduit 74 which thus extends from the bracket 35 to the transformer assembly B, a portion of the conduit 74 being broken away to more fully disclose the separate wires for a distance. Also the portions of the wires 57 and 58 which extend adjacent one another between the bracket 35 and the grommet 73 may be enclosed in a single conduit (not shown) which, if desired, may extend between the grommet 73 and the bracket 35.

The transformer assembly B may be supported on the wall 75 in a convenient position, such as under the usual telephone box which is ordinarily attached to the wall 75 adjacent the telephone device assembly A.

The transformer assembly B is connected by the electric wire or cable 76 with the electric connection 77 which is adapted to fit into the wall plug 78. The transformer assembly B is required for use with the neon tube 29 where it is connected with a source of electric supply of 110 volts, which is the voltage in the electric supply source of the usual lighting system, as the neon tube 29 requires a much higher voltage than 110 volts, the transformer assembly B stepping up or increasing the voltage to whatever is required for operating my lighting means when employing the neon type of illumination. In Fig. 4, the wires 79 and 80 are respectively connected, in a manner similar to that of the wires 58 and 57, with the terminal screws 61 and 62, the wire 80 being extended through the standard 2 and the housing 1 to connect with the terminal 46, the wire 79 being extended through the standard 1 and the housing 2 to emerge through the grommet 73 and extend, through the conduit 81, to the transformer assembly B as above described, the extension of the portions 42 and 43 into the housing 2 eliminating the necessity of extending the wires from the grommet 73 to any supporting bracket, such as 35 in Fig. 1. The wire 82 is connected to the terminal portion 45 of the tube 29 and extends through the housing 2 to emerge through the grommet 73 into the conduit 81 as above described.

When it is desired to illuminate the dial plate 16 by an electric light bulb instead of the neon tube 29, the member 6 is provided with a suitable opening to receive the socket 83 which is provided with the flange 84 and adapted to be secured by the rivets 85, as disclosed in Fig. 8. The electric light bulb 86 is provided with the threads 87 which are adapted to engage the socket 83, the bulb 86 being provided with the terminal 88 adapted to contact with the terminal 89 to which the wire 90 is secured, the wire 90 extending through the housing 2 to emerge through the grommet 73 and enter the conduit 91 which extends to the transformer assembly C, as disclosed in Fig. 7, and which is supported on the wall 75' in a similar manner as the transformer assembly B. The wire 92 is connected to the terminal screw 61 and extends through the standard 2 and the housing 1 and also emerges through the grommet 73 into the conduit 91, the wires 92 and 90 thus being connected to the transformer assembly C which is in turn connected, by the wire or cable 93 to the electric connection 94 which is adapted to fit into the wall plug 95 which is suitably connected with the source of electric supply of the building in which the telephone device assembly is used. The wire 95' is connected to the terminal screw 62 and to a grounded portion of the threads 87, said grounded portion and the terminal 89 being indicated diagrammatically by small circles in Fig. 6.

The transformer assembly C is of the necessary type which will step down or decrease the usual 110 voltage, of the ordinary source of electric power for the building in which the telephone device is being used, to approximately five volts so that a low voltage of electric bulb 86 may be used as a relatively small amount of light is required, in my invention, to efficiently illuminate the dial member 16 because of its transparent characteristics, thus providing a very economical lighting means when so desired.

It is to be understood, however, that a bulb of the proper size of 110 voltage may be used, when desired in place of the five volt bulb 86, by eliminating the use of the transformer assembly C and by using the direct current of 110 voltage.

It is to be noted that the cup member 13, as disclosed in Fig. 8, together with the plate member 8 will be provided with suitable openings to permit the electric light bulb 86 to be inserted therethrough to engage the socket 83, the electric light bulb 86 extending into the chamber 31 directly below the dial plate 16 in a similar manner as the neon tube 29 for the illumination of the dial plate 16, both the bulb 86 and the neon tube 29 being readily removable when the dial plate 16, the finger dial 24 and the nut 22 have been removed.

When it is desired to provide illumination around and adjacent the telephone assembly A when equipped with the electric light bulb 86 as in Figs. 6 and 8, the bracket 96 is suitably supported by the screw 4 and the bosses 5, the bracket 96 supporting the flexible tube member 97 which in turn is connected to and supports the socket connection 98 which is adapted to permit the insertion of the electric light bulb 99 therein. The shield or shade member 100 is pivotally connected to the socket connection 98 to permit its pivotal movement to any desired shielding position relative to the bulb 99.

It is to be noted that the flexible tube member 97 will permit the light assembly D to be moved to any desired angular position relative to the telephone assembly A, thereby permitting an easy and readily adjustable lighting means at the upper portion of said telephone assembly A.

The wire 103 is connected to the terminal screw 62 and to the terminal screw 101 of the bulb 99 and the wire 104 is connected to the terminal screw 102 of the bulb 99 and to the electric supply wire 90, thus providing a system of wiring whereby the light bulbs 86 and 99 are electrically connected in parallel so that if one bulb is rendered inoperative, the other of the bulbs will still be operative. The wires 103 and 104 are disclosed in Figs. 10 and 6, and when used as disclosed in Fig. 10, the wires 92 and 95' will respectively replace the wires 58 and 57.

The wires or cables 105 and 106 are the necessary and usual members as provided for the electrical operation of the telephone mechanism of the telephone assembly A, said wires being disclosed in Figs. 4 and 6. In operation, when the receiver 67 is lifted or removed from the receiver hook 65, the receiver hook 65 will move from its position as disclosed in Fig. 12 to the position, as disclosed in Fig. 11, in which the receiver hook 65 has been moved upwardly, by the usual resilient mechanism (not shown) employed in telephone mechanisms, the upward movement of the receiver hook 65 moving its contact portion 68 sufficiently to allow the resilient switch operating member 69 to move the switch contact member 53 from its open position as disclosed in Fig. 12 to its closed position as disclosed in Fig. 11, in which closed position the switch contact member 53 contacts with the switch contact member 54.

With the switch contact members 53 and 54 thus moved to their closed or contacting positions, as disclosed in Figs. 10 and 11, the electric current will flow from its source through the transformed assembly B and through the wire 57 to the terminal screw 62, through the switch contact members 53 and 54, the wire 58, the terminal portion 38, through the neon gas in the portion 32, the convolution 30, the parallel portion 33, the convolution 39, and the parallel portion 40 of the tube 29 to the terminal portion 41 and then through the wire 73' completing the circuit back to the source of electric supply.

Thus as the receiver 67 is lifted from the receiver hook 65, the neon tube 29 will automatically be illuminated, the supply of electric current being automatically broken or opened by the replacement of the receiver 67 on the receiver hook 65 to turn off the illumination of the tube 29.

In a similar manner the illumination of the tube 29 in Fig. 4 is automatically turned on or off by the operation of the receiver 67 and the receiver hook 65.

Also in a similar manner, the illumination of the electric light bulb 86 in Figs. 6 and 8 is accomplished, the electric current flowing from its source of supply through the plug 95, the connection 94, the wire 93, the transformer assembly C, the wire 92 to the terminal screw 61 and thence through the switch contact members 53 and 54 to the terminal screw 62, the wire 95' and to the terminal portion of the threads 87 to illuminate the bulb 86 which in turn shines through and illuminates the dial plate 16.

At the same time when the electric current passes through the switch contact members 53 and 54 to the terminal screw 62, the electric current will flow through the wire 103 to the terminal 101 to illuminate the bulb 99, the current completing its circuit through the terminal 102, the wire 104 and the wire 90 back to its source of supply. When the receiver 67 is placed back on the receiver hook 65, the light bulbs 86 and 99 will be turned off automatically as above described in reference to the operation of the telephone assemblies A in Figs. 1 and 2.

I claim:

1. In a lighting device for a telephone provided with a housing for supporting a dial and transmitter mechanism together with switch mechanism therefor, the combination of a dial plate constructed of transparent material, a suitably mounted housing supporting said dial plate, a bracket suitably supported on the housing of the telephone, a container for containing neon gas, said container being supported in said bracket, said container being provided with a portion extending adjacent the under side of said dial plate, said container being provided with a portion extending adjacent the housing of the telephone, said container being provided with terminal portions in said bracket, a transformer connected with a source of electric current, said transformer being electrically connected with the terminal portions of said container, and a switch mechanism automatically opening and closing the electrical circuit connected with said container, said switch mechanism being operatively associated with the switch mechanism of the telephone.

2. In a lighting device for a telephone, the combination of a dial plate constructed of transparent material, and a member containing a gaseous mixture, said member being suitably mounted to extend adjacent said dial plate to cause light to shine therethrough, said member further extending beyond said dial plate to provide illumination adjacent the telephone, and electrical means for causing the gaseous mixture to provide illumination through said dial plate.

3. In a lighting device for a telephone, the combination of a dial plate constructed of transparent material, and illuminating means for causing light to shine through said dial plate, said illuminating means being suitably mounted to extend to a point on the outside of the telephone to provide illumination on the outside thereof.

4. In a lighting device for a telephone provided with a translucent dial plate suitably mounted to be visible at one of its sides, lighting means for illuminating said translucent dial plate, said lighting means being suitably located adjacent the side of said translucent dial plate oppositely disposed to its visible side, said lighting means including a convoluted portion located adjacent the outside surface of the telephone to provide illumination on the outside of the telephone.

5. In a lighting device for a telephone provided with a standard member for supporting transmitting mechanism, the combination of a dial member suitably supported adjacent said standard member, a container adjacent said dial member, said container being provided with a portion extending to a position oppositely disposed from said dial member relative to said standard, said container being filled with a gaseous mixture, and means electrically connected with said container to cause said gaseous mixture to illuminate said dial member and outside portions of the telephone.

6. In a lighting device for a telephone provided with a dial member together with a standard member, the combination of a bracket suitably mounted on the standard member of the telephone, and an illuminating member suitably mounted in said bracket, said illuminating member extending on opposite sides of said standard member to respectively illuminate the dial member and the outside of the telephone, and electrically operated means for controlling the operation of said illuminating member.

7. In a lighting device for a telephone provided with a housing and a dial member suitably mounted thereon, the combination of an illuminating member provided with a pair of tubular ends extending into the housing of the telephone, said illuminating member being further provided with a circular shaped convolution adjacent said dial member, and electrical means for controlling the operation of said illuminating member, said electrical means being suitably mounted to enter said housing at a point removed from said tubular ends extending into said housing.

8. In a lighting device for a telephone provided with a dial mechanism, the combination of a cup member having an open side, said cup member being suitably mounted adjacent the dial mechanism of the telephone, said cup member being provided with ledge portions together with slots adjacent its ledge portions, a dial member supported on the ledge portions of said cup member, said dial member being constructed of material to permit light to shine therethrough, said dial member being provided with extension portions engaging the slots of said cup member, said dial member closing the open side of said cup member, a light member located between said dial member and the closed side of said cup member, and means for controlling the operation of said light member.

9. In a lighting device for a telephone, provided with a supporting housing, the combination of a cup member suitably mounted on the telephone, said cup member being provided with an opening in its lower wall, a translucent dial member suitably mounted adjacent said cup member to provide a chamber between said translucent dial and said cup members, and lighting means located in said cup member, said lighting means being suitably mounted, in the supporting housing of the telephone, to extend within the opening of said cup member.

10. In a lighting device for a telephone provided with a revolvably mounted dial mechanism together with a supporting housing therefor, the combination of means for mounting the revolvably mounted dial mechanism in an extended position relative to the supporting housing of the telephone to provide room for a light enclosing member, a light enclosing member suitably mounted between the supporting housing and the revolving dial of the telephone, a fixed dial member suitably mounted between said light enclosing member and the revolving dial of the telephone, said fixed dial member being adapted to permit light to shine therethrough, and lighting means suitably mounted to extend within said light enclosing member.

11. In a lighting device for a telephone provided with a standard member, the combination of a member mounted in said standard member and provided with a pair of openings therethrough, said openings being oppositely disposed about the vertical center of said member mounted in said standard member, insulator bushings mounted in each of said openings and each provided with a flange, a terminal screw in each of said insulator bushings, a contact member supported on each of said terminal screws, electrical wires clamped between the flanges of said insulator bushings and said contact members supported on said terminal screws, a switch operating member mounted between said insulator bushings, a switch contact member secured by one of said terminal screws and provided with a lateral extension portion, a second switch contact member secured by the other of said terminal screws and provided with a lateral extension portion, said lateral extension portions of said switch contact members being in alignment with each other and with said switch operating member, one of said lateral extension portions being moved, by said switch operating member, to contact the other of said lateral extensions, an insulator member mounted between one of said switch contact members and said switch operating member to prevent contact therebetween, and light means operatively connected with said electrical wires.

12. In a lighting device for a telephone provided with a standard together with a screw member for pivotally supporting a transmitter mechanism at the upper end of the standard, the combination of a forked bracket pivotally mounted on said screw member at the sides of the transmitter mechanism, a flexible member supported by said forked bracket, a lighting member suitably mounted on said flexible member, a movably mounted member for shielding the light from said lighting member, means for connecting said lighting member with a source of electrical current, and means for controlling the operation of said lighting member by the operation of the telephone mechanism, said last mentioned means being operatively connected with the telephone mechanism and said first mentioned means.

13. In a lighting device for a telephone provided with a standard and dial member, the combination of a bracket suitably supported on the standard of the telephone and provided with a chamber, a tubular lighting member suitably mounted in said bracket and extending on each side thereof to illuminate the dial member and the outside of the telephone, said tubular lighting member being provided with terminal portions located within the chamber of said bracket, and means for connecting said tubular lighting member with a source of electrical current.

14. In a lighting device for a telephone, the combination of a lighting member and a switch means for controlling the operation of said lighting member, said switch means being operatively controlled by the operation of the telephone, said switch means comprising a pair of switch contact members mounted laterally on opposite sides of a switch operating member, said pair of switch contact members being provided with lateral extension portions located in alignment with each other and with said switch operating member, one of said extension portions being adapted to contact said switch operating member and the other of said extension portions.

15. In a lighting device for a telephone provided with a translucent dial member, the combination of means for supporting the translucent dial member in an extended position relative to its original position on the telephone to provide sufficient space for installing a lighting means, and lighting means for illuminating the translucent dial member, said lighting means being located directly under and adjacent the translucent dial member, said lighting means extending through the space originally occupied by said translucent dial member.

16. In a lighting device for a telephone provided with a dialing mechanism and an enclosing member therefor, the combination of a cup member suitably mounted on the enclosing member and provided with notches in its periphery together with ledge portions adjacent its notches, a translucent dial member provided with tongue portions engaging the notch and ledge portions of said cup member, and lighting means suitably mounted and extending within said cup member.

17. In a lighting device for a telephone provided with a dialing mechanism, the combination of a housing member suitably mounted on the telephone and extending around the dialing mechanism, a socket member suitably mounted on said housing member, a cup member suitably mounted on said housing member and provided with an opening in alignment with said socket member, a translucent dial member suitably mounted on said cup member, a lighting member mounted in said socket member and extending through the opening in said cup member, and means for connecting said lighting member with a source of electrical current.

GEORGE KELLER.